H. F. STEWART.
CIDER PRESS.
APPLICATION FILED FEB. 12, 1920.
1,419,700.
Patented June 13, 1922.
3 SHEETS—SHEET 1.
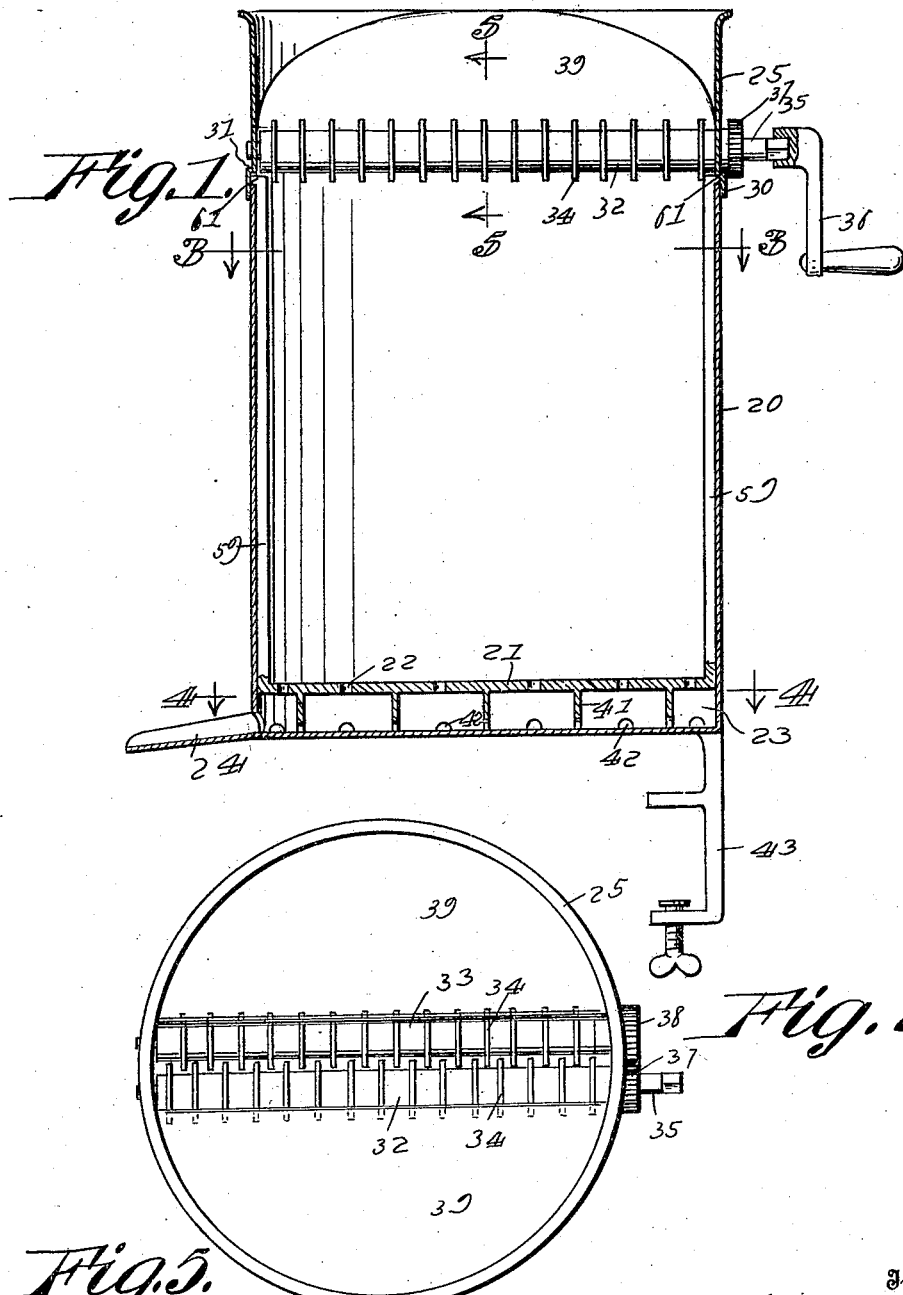
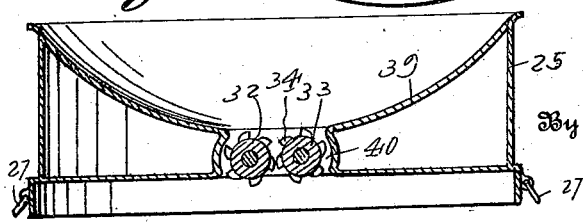

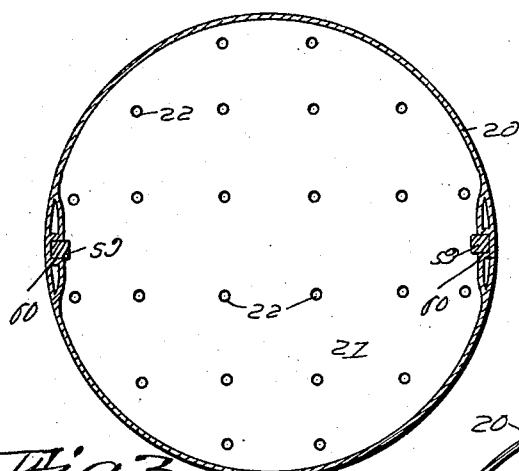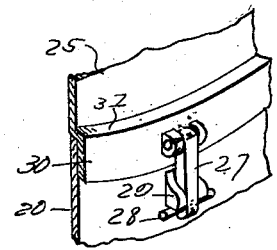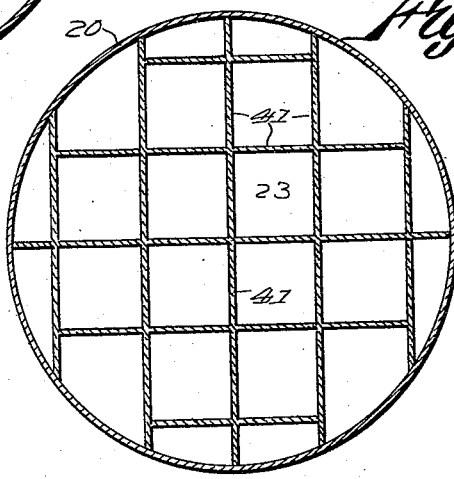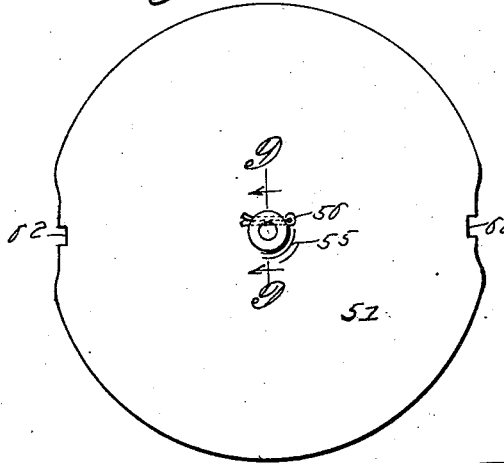

H. F. STEWART.
CIDER PRESS.
APPLICATION FILED FEB. 12, 1920.
1,419,700.
Patented June 13, 1922.
3 SHEETS—SHEET 3.
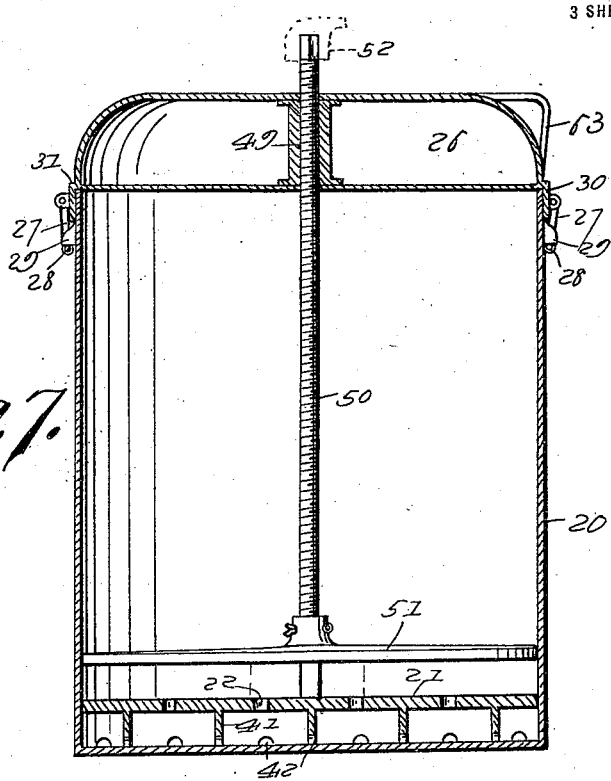
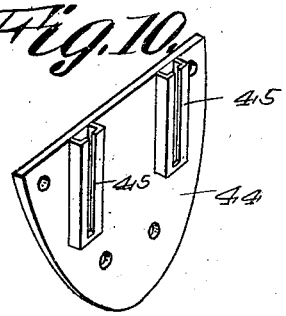
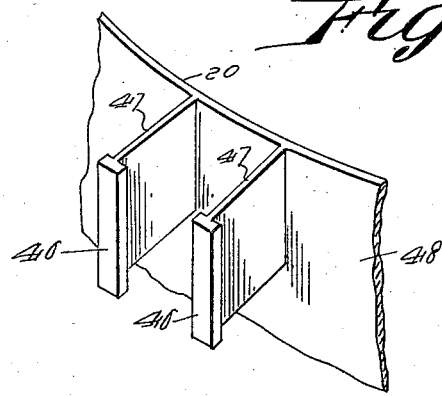
Inventor
H. F. Stewart,
By
Attorney

UNITED STATES PATENT OFFICE.

HARRY F. STEWART, OF SPRINGFIELD, ILLINOIS.

CIDER PRESS.

1,419,700. Specification of Letters Patent. Patented June 13, 1922.

Application filed February 12, 1920. Serial No. 358,169.

*To all whom it may concern:*

Be it known that HARRY F. STEWART, a citizen of the United States of America, residing at Springfield, in the county of Sangamon and State of Illinois, has invented new and useful Improvements in Cider Presses, of which the following is a specification.

The object of the invention is to provide a cider-making apparatus adapted to provide for an efficient and economical expression of the juice of apples and similar fruit in the preparation of cider and analogous beverages and extractions, and to this end the same consists in a construction and combination of parts in which a preferred embodiment is shown in the accompanying drawing, it being understood that changes in form and proportion may be resorted to within the scope of the claims without departing from the principles involved.

In the drawing:

Figure 1 is a sectional view of the apparatus fitted with one of the interchangeable heads adapted for reducing the fruit to a comminuted form.

Figure 2 is a plan view of the same.

Figure 3 is a horizontal section on the plane indicated by the line 3—3 of Figure 1.

Figure 4 is a horizontal section on the plane indicated by the line 4—4 of Figure 1.

Figure 5 is a vertical section on the plane indicated by the line 5—5 of Figure 1.

Figure 6 is a detail view of one of the fastening devices employed for securing the interchangeable head to the body or cylinder of the apparatus.

Figure 7 is a vertical sectional view of the device with the plunger carrier head substituted for the comminuting head illustrated in Figure 1.

Figure 8 is a plan view of the plunger.

Figure 9 is a detail sectional view on the plane indicated by the line 9—9 of Figure 8.

Figure 10 is a detail of a wall bracket and Figure 11 a similar view of T-heads carried by the body portion or cylinder of the apparatus for supporting the latter when of large dimensions.

Figure 12 is a detail view of the outlet or branch spout for conveying the juice from the bottom of the receptacle.

The apparatus consists essentially of a receptacle 20, shown in the drawings as of cylindrical form but obviously adapted to be made in any preferred cross-sectional shape provided near its bottom with a strainer 21 perforated as at 22 to permit juice expressed from the contents of the receptacle to pass into a lower compartment 23 from which it is permitted to flow through an outlet spout 24; together with interchangeable heads shown respectively at 25 in Figure 1 and at 26 in Figure 7, either of which may be applied to the top of the receptacle 20, and each of which is provided with pivotal tongues 27 having cross-heads 28 for engagement with lugs 29 formed on the wall of the receptacle near its upper edge. Preferably an overlapped joint is formed between the head and the wall of the receptacle by downwardly flanging the former as shown at 30 to engage the exterior surface of the wall, a shoulder 31 on the head serving to bear on the upper edge of said wall.

In the comminuting or granulating head 25 shown in Figures 1, 2 and 3 there are mounted the cooperating rollers 32 and 33 provided with inter-current knives or blades 34 designed as the rollers are turned to reduce the fruit to a relatively finely divided state so as to promote the operation of expressing the juice therefrom. One of these rollers is extended to form a spindle 35 to which may be attached an operating crank 36 as shown in Figure 1, while cooperative motion of the two rolls is secured by intermeshing gears 37 and 38 with which they are provided. The bottom of the head as shown at 39 is constructed to form a funnel leading to the outlet 40 in which the rolls are located so as to insure the treatment of all of the contents of the head by the knife rollers as the fruit passes from the head into the body of the receptacle.

Depending from the screen or grating 21 are the reenforcing and supporting ribs 41 which bear at their lower edges upon the bottom of the receptacle to prevent sagging, the lower edges of said webs or ribs being notched as shown at 42 to permit the juice to flow to the outlet spout 24. Also in connection with small sizes of apparatus a clamp bracket 43 may be employed for engagement with a table or stand, but when the device is made of large dimensions for operating upon considerable quantities of fruit at one time a support such as that shown in Figures 10 and 11 is preferable, the same consisting of a bracket plate 44 having undercut or cross-sectionally T-shaped guides 45 for the reception of T-heads 46 on plates 47 projecting from a band 48 embracing or otherwise secured to or forming a part of the wall of the cylindrical receptacle.

In the interchangeable head 26 there is provided a nut or interiorly threaded guide 49 with which is engaged the threaded stem or feed screw 50 carrying a presser head or plunger 51 adapted to be fitted in the receptacle and forced downward by means of a crank arm 52 detachably engaged with the upper end of the feed screw, and it is preferable to provide a swivel joint between the lower end of the feed screw and the plunger or presser head as shown in detail in Figure 9 wherein the feed screw is provided near its lower extremity with an annular groove 53 registering with a corresponding internal groove 54 in a socket 55 formed on the plunger, for the reception of a split key 56. Also preferably the lower end of the feed screw is rounded as shown at 57 for contact with a double convexed bearing disk 58 arranged in the bottom of the socket, so as to reduce the friction incident to the turning of the feed screw in the depression of the plunger.

In order that the pulp carried by the screen or grating 21 may be removed from the receptacle after the conclusion of the pressing operation, it is provided with upwardly extending guide arms 59 fitted in guide grooves 60 formed in the inner surfaces of the wall of the receptacle and outwardly turned at their upper ends to form ears 61 which bear upon the upper edge of the receptacle wall and may be grasped by the operator to facilitate the lifting of the screen or grating and hence the bodily removal of the pulp. The guide arms 59 preferably project slightly beyond the guide grooves 60 to form guiding ribs and the presser head or plunger 21 is provided with peripheral notches 62 for engagement therewith so that the said presser head is held from rotation in its progress through the receptacle in the course of expressing the juice from the comminuted or granulated contents thereof.

It will be understood from the foregoing description that an effective removal of juice from fruit and particularly that of the apple family may be secured with a moderate expenditure of time and effort on the part of the operator, the removal of the juice being substantially complete without involving the passage of any considerable or objectionable percentage of the pulp through the screen or grating, and at the same time owing to the preliminary reduction of the fruit to a comminuted form the strain upon the apparatus is minimized and a less sturdy structure is required in performing the operation.

A supplemental handle or grip 63 is provided on the interchangeable head which carries the plunger, as a means of enabling the operator to steady the apparatus in forcing the plunger downward in the compression of the contents of the receptacle.

What is claimed is:

1. An apparatus of the class described having a receptacle provided with interchangeable heads respectively carrying grinding and pressing devices, and a screen or grating removably fitted in the receptacle and provided with upwardly extending guide arms arranged in guide grooves formed in the wall of the receptacle, said pressing device including a plunger provided with peripheral guide notches for engaging said guide arms, and a feed screw having a swiveled engagement with the plunger.

2. An apparatus of the class described comprising a receptacle, a screen or grating removably fitted in the receptacle and provided with upwardly extending guide arms arranged in guide grooves formed in the wall of the receptacle, a plunger provided with peripheral guide notches for engaging said guide arms, and means for forcibly advancing the plunger in the direction of the screen or grating.

In testimony whereof he affixes his signature.

HARRY F. STEWART.